J. H. SHAW.
GAME TRAP.
APPLICATION FILED JUNE 5, 1912.

1,090,576.

Patented Mar. 17, 1914.

WITNESSES:
F. A. Carlson
Mary E. Fuller

INVENTOR:
John H. Shaw,
BY
Beach & Fisher
ATTORNEYS.

UNITED STATES PATENT OFFICE.

JOHN H. SHAW, OF NEW HAVEN, CONNECTICUT, ASSIGNOR TO SARGENT & COMPANY, OF NEW HAVEN, CONNECTICUT, A CORPORATION OF CONNECTICUT.

GAME-TRAP.

1,090,576.

Specification of Letters Patent.

Patented Mar. 17, 1914.

Application filed June 5, 1912. Serial No. 701,815.

*To all whom it may concern:*

Be it known that I, JOHN H. SHAW, a citizen of the United States, residing at New Haven, county of New Haven, and State of Connecticut, have invented certain new and useful Improvements in Game-Traps, of which the following is a full, clear, and exact description.

This invention relates to game traps, and particularly to the construction of the base supporting the jaws, and to the relation with respect to the base of the plate or strip supporting the bait pan and trigger mechanism.

Ordinarily, the plate or strip supporting the bait pan and trigger mechanism is riveted to the base for the jaws, and said base is formed as a single plate or strip of metal extending continuously from the support at one end of the jaws to the support at the other end of the jaws. Very often, the base is formed of a single strip of metal having upturned integral ends with perforations in which the ends of the jaws are fitted. The arrangement above described has the disadvantage that it is practically impossible to take the trap apart for repairs, so that when the bait pan or trigger mechanism is broken the whole trap must be thrown away. Moreover, if one of the jaws is broken or injured in any way, it is very often a difficult matter to remove it from the base, and it is even more difficult to replace it with a new jaw, the base being of sufficient rigidity to resist very strongly any bending movement, such as would permit the introduction of the end portions of a new jaw or jaws into the perforated lugs rising from the base.

The object of my invention is to remedy these various defects, and to provide a trap in which the various parts can be very readily taken apart and reassembled. In my invention, the replacement of the jaws, base and bait pan carrier is a very simple matter, and the construction is practically as simple and strong as that of the ordinary traps heretofore in use.

To these and other ends, the invention consists in the novel features and combinations of parts to be hereinafter described and claimed.

Figure 1:
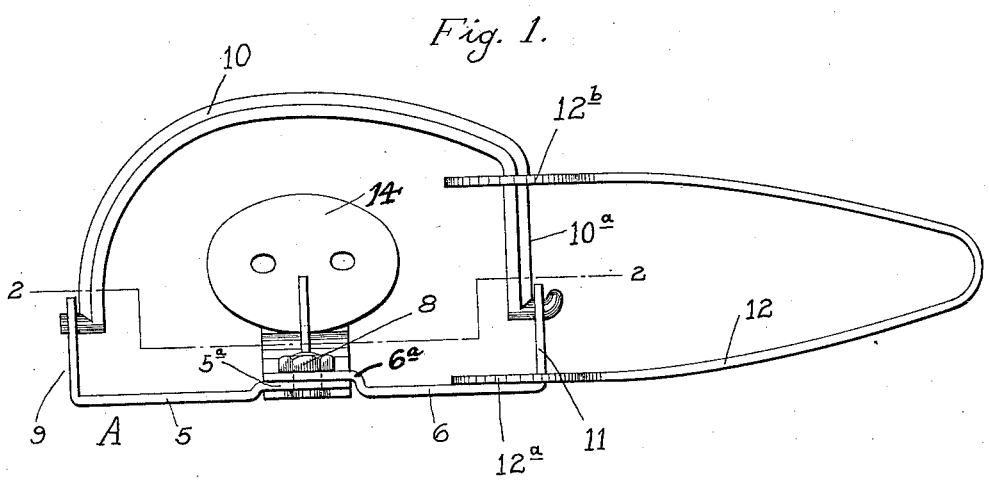
Figure 2:
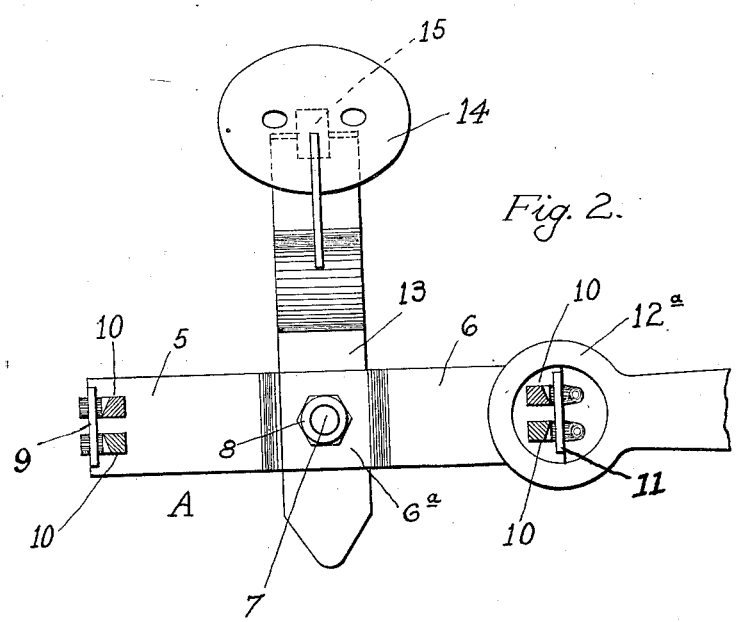

In the accompanying drawing, Figure 1 is a side elevation of a trap embodying the invention, showing the bait pan in backwardly tilted position, and Fig. 2 is a horizontal longitudinal section on line 2—2 of Fig. 1, also showing the bait pan tilted back over the trigger mechanism.

Referring to the drawing, A indicates the base of the trap, which is formed of two sections, 5 and 6. These sections have at their meeting extremities portions 5ª and 6ª respectively which overlap each other, and are secured together by a bolt 7, having a nut 8 at the upper surface of the base. The section 5 is provided at the end opposite the connection with the section 6, with an integral lug 9, having perforations to receive the pivots or trunnions of jaws 10. In a similar manner, the section 6 is provided with an upturned perforated lug 11 to receive the opposite pivotal ends of the jaws 10. These jaws are normally held together in their raised position by a V-shaped spring 12 having at one end an eye 12ª embracing the lug 11, and provided at the opposite end with a similar eye 12ᵇ embracing the upright portions 10ª of the jaws 10.

The strip or plate 1³ extends transversely beneath the base A, and carries the bait pan 14, with which coöperates a trigger 15. The bait pan strip or support 13 extends under the overlapping ends 5ª, 6ª of the base sections 5 and 6, and it is detachably secured to said sections by the bolt 7. In order to provide a firm flat support for the trap, the lower surface of the strip 13 fits in a recess formed by offsetting the ends 5ª, 6ª of the base sections, so that the lower surface of the strip 13 is substantially flush with the lower surfaces of the main parts of the sections 5 and 6. The head of the bolt 7 is countersunk in the strip 13, as indicated by the dotted lines in Fig. 1, so as not to project beyond the flat base of the trap.

When the bait pan or trigger mechanism is injured or broken, the bait pan bar or strip 13 may be easily removed from the trap by removing the bolt 7, as will be understood, after which the same strip or bar, or another strip or bar, can be assembled in the trap. If one of the jaws 10 becomes injured or broken, it can be taken out of the trap very quickly by removing the bolt 7 and disconnecting the sections 5 and 6, which can then be readily slipped over the pivots or trunnions at the end of the jaw. A new jaw may be easily placed in the trap by bringing together sections 5 and 6 in such a manner that the perforations in the lugs 9 and 11 take over the trunnions or pivots at the ends of the jaw, after which the bolt 7 is replaced with the parts in the position shown in Fig. 1.

It will therefore be understood that my invention provides a trap of extreme simplicity, which can be readily taken apart and re-assembled, for the repair and replacement of the various parts, including the actuating spring.

While the foregoing description is a detailed one, in so far as it concerns the particular embodiment of my invention selected for illustration, it will be manifest that many modifications of the construction may be adopted within the scope of my invention.

What I claim is:

1. In a game trap, the combination of jaws, a base for said jaws composed of separate sections, a bait pan support, and a single member for inter-connecting the base sections detachably and securing the bait pan support detachably to the base; substantially as described.

2. In a game trap, the combination of jaws, operating means therefor, a base for said jaws composed of sections having their adjacent ends located intermediate of the ends of the base, means securing said jaws to said base and providing for the release of the same from the base as said sections are separated, a bait pan, a bait pan support, and a bolt for detachably securing together the base sections and the bait pan support, substantially as described.

3. In a game trap, a base comprising sections having ends which overlap intermediate of the length of the base, said overlapping ends being offset to provide a transverse recess in the base, a bait pan supporting bar located in said recess, and means for detachably securing the overlapping ends of the base sections to each other and to the bait pan support; substantially as described.

4. In a game trap, the combination of jaws, operating means therefor, a base for said jaws divided intermediate of the ends of the base into separate sections, means securing said jaws to said base and providing for the release of the same from the base as said sections are separated, means to secure said sections detachably together, a bait pan, and a bait pan support carried by said base, substantially as described.

In witness whereof, I have hereunto set my hand on the 3rd day of June, 1912.

JOHN H. SHAW.

Witnesses:
SYDNEY F. SARGENT,
BERTHA RAY.

---

Copies of this patent may be obtained for five cents each, by addressing the "Commissioner of Patents, Washington, D. C."